United States Patent
Parameswaran et al.

(10) Patent No.: US 7,672,694 B2
(45) Date of Patent: Mar. 2, 2010

(54) LOW POWER CHIP ARCHITECTURE

(75) Inventors: Sridevan Parameswaran, Kensington (AU); Jorgen Peddersen, Randwick (AU); Ashley Partis, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 714 days.

(21) Appl. No.: 10/879,111

(22) Filed: Jun. 30, 2004

(65) Prior Publication Data

US 2005/0007972 A1    Jan. 13, 2005

(30) Foreign Application Priority Data

Jul. 7, 2003    (AU) ............................ 2003903480

(51) Int. Cl.
*H04M 1/00*    (2006.01)
*H04L 12/28*    (2006.01)
*H04J 3/16*    (2006.01)
*G06F 3/00*    (2006.01)

(52) U.S. Cl. .................. 455/574; 370/395.52; 370/469; 710/11

(58) Field of Classification Search .............. 455/127.1, 455/127.5, 38.2, 572, 574, 343.1, 343.2, 455/343.3, 343.4, 343, 343.5; 370/318, 395.52, 370/469; 340/7.32, 382; 713/323, 324, 320; 710/11

See application file for complete search history.

(56) References Cited

U.S. PATENT DOCUMENTS

| | | | |
|---|---|---|---|
| 5,802,305 A * | 9/1998 | McKaughan et al. ........ | 709/227 |
| 6,034,963 A | 3/2000 | Minami et al. .............. | 370/401 |
| 6,101,608 A | 8/2000 | Schmidt et al. ............. | 713/202 |
| 6,480,489 B1 | 11/2002 | Muller et al. ............... | 370/389 |
| 6,483,804 B1 | 11/2002 | Muller et al. ............... | 370/230 |
| 6,650,640 B1 | 11/2003 | Muller et al. ............... | 370/392 |
| 6,968,219 B2 * | 11/2005 | Pattabiraman et al. ...... | 455/574 |
| 7,293,113 B1 * | 11/2007 | Krishna et al. ............. | 709/250 |
| 2002/0162038 A1 | 10/2002 | Bullman et al. ............. | 713/323 |
| 2003/0097476 A1 | 5/2003 | Saxena et al. .............. | 709/247 |
| 2003/0135678 A1 | 7/2003 | Andre ........................ | 710/243 |
| 2004/0100964 A1 | 5/2004 | Robotham et al. .......... | 370/394 |
| 2004/0141524 A1 | 7/2004 | Lee et al. .................... | 370/469 |
| 2004/0158754 A1 * | 8/2004 | Walls et al. ................. | 713/323 |
| 2005/0220093 A1 | 10/2005 | Chen et al. .................. | 370/389 |
| 2007/0086447 A1 | 4/2007 | Parameseswaran et al. .. | 370/389 |
| 2007/0214358 A1 | 9/2007 | Partis ......................... | 713/161 |

FOREIGN PATENT DOCUMENTS

WO    2005/050925    6/2005

OTHER PUBLICATIONS

U.S. Appl. No. 10/571,929, filed Nov. 10, 2006; Inventors Parameswaran, et al.
International Search Report mailed Dec. 22, 2004 in International Application No. PCT/AU2004/001617.

* cited by examiner

*Primary Examiner*—Nick Corsaro
*Assistant Examiner*—Shannon R Brooks
(74) *Attorney, Agent, or Firm*—Fitzpatrick, Cella, Harper & Scinto (57) ABSTRACT

An architecture for selectively powering a receive module (108) is disclosed. The architecture comprises the receive module (108) which is functionally adapted, while power is applied to the receive module (108) by a power module (601), and after a power-up time interval has elapsed, to process a traffic packet. The architecture further comprises the power module (601) that is adapted to apply power to the receive module 108 dependent upon arrival of a wake-up packet.

8 Claims, 8 Drawing Sheets

LOW POWER CHIP ARCHITECTURE

FIELD OF THE INVENTION

The present invention relates generally to saving power in electronic circuits, and, in particular, to saving power in packet based communication systems.

BACKGROUND

In typical packet communication protocol stacks, most protocol modules are in an idle state most of the time. Even when packets are arriving, only subsections of the overall protocol stack will be operating, while others will be in an idle state. Clearly this is disadvantageous from the point of view of power consumption.

SUMMARY OF THE INVENTION

The present invention exploits the nature of some packet communication protocols by discarding a small number of packets in order to control power consumption in equipment modules that receive packet traffic. According to the disclosed arrangement, an equipment module which is not used for a while (ie to which no packets have been directed for some time) is "put to sleep" by being powered down. When a packet addressed to the equipment module next arrives at the module, the packet arrival is used to "wake up" the module. In the course of waking up the module, the data in the arriving packet may be lost.

When this technique is applied to "reliable" packet protocols such as Transmission Control Protocol (TCP), Reliable User Datagram Protocol (RUDP), and Sequenced Packet eXchange (SPX, from the IPX/SPX suite of protocols), the discarded packet is retransmitted, and accordingly the loss of the discarded packet does not degrade the integrity of the communication.

When this technique is used with "unreliable" protocols such as UDP, then loss of the discarded packet does not impact the integrity of the communications, which in any event assume that a certain number of packets will be lost because of the inherent unreliability of the particular protocol being used.

There are certain instances in which the described low power technique should not be used. Communication protocols where the use of this technique is not appropriate include the Internet Control Message Protocol (ICMP), and the Internet Group Management Protocol (IGMP).

According to a first aspect of the present invention, there is provided an architecture for selectively powering a receive module, the architecture comprising:

said receive module, being functionally adapted while power is applied to the receive module and after a power-up time interval has elapsed to process a traffic packet; and a power module adapted to apply said power to the receive module dependent upon arrival of a wake-up packet.

According to another aspect of the present invention, there is provided a method of selectively powering a packet protocol receive module the method comprising the steps of:

receiving a wake-up packet;

applying power to the receive module for a predetermined time interval;

processing the wake-up packet if the receive module is in a powered-up state;

if a succeeding packet arrives before the predetermined time interval has elapsed, (a) processing the succeeding packet, and (b) applying power to the receive module for a further predetermined time interval; and if the predetermined time interval elapses without arrival of the succeeding packet, powering down the receive module.

According to another aspect of the present invention, there is provided a computer program for directing a machine to selectively power a packet protocol receive module the program comprising:

code for receiving a wake-up packet;

code for applying power to the receive module for a predetermined time interval;

code for (a) processing a succeeding packet and (b) applying power to the receive module for a further predetermined time interval, if the succeeding packet arrives before the predetermined time interval has elapsed; and code for powering down the receive module if the predetermined time interval elapses without arrival of the succeeding packet.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

It is to be noted that the discussions contained in the "Background" section and that above relating to prior art arrangements relate to discussions of devices which form public knowledge through their use. Such should not be interpreted as a representation that such devices in any way form part of the common general knowledge in the art.

Where reference is made in any one or more of the accompanying drawings to steps and/or features, which have the same reference numerals, those steps and/or features have, for the purposes of this description, the same function(s) or operation(s), unless the contrary intention appears.

Figure 1:
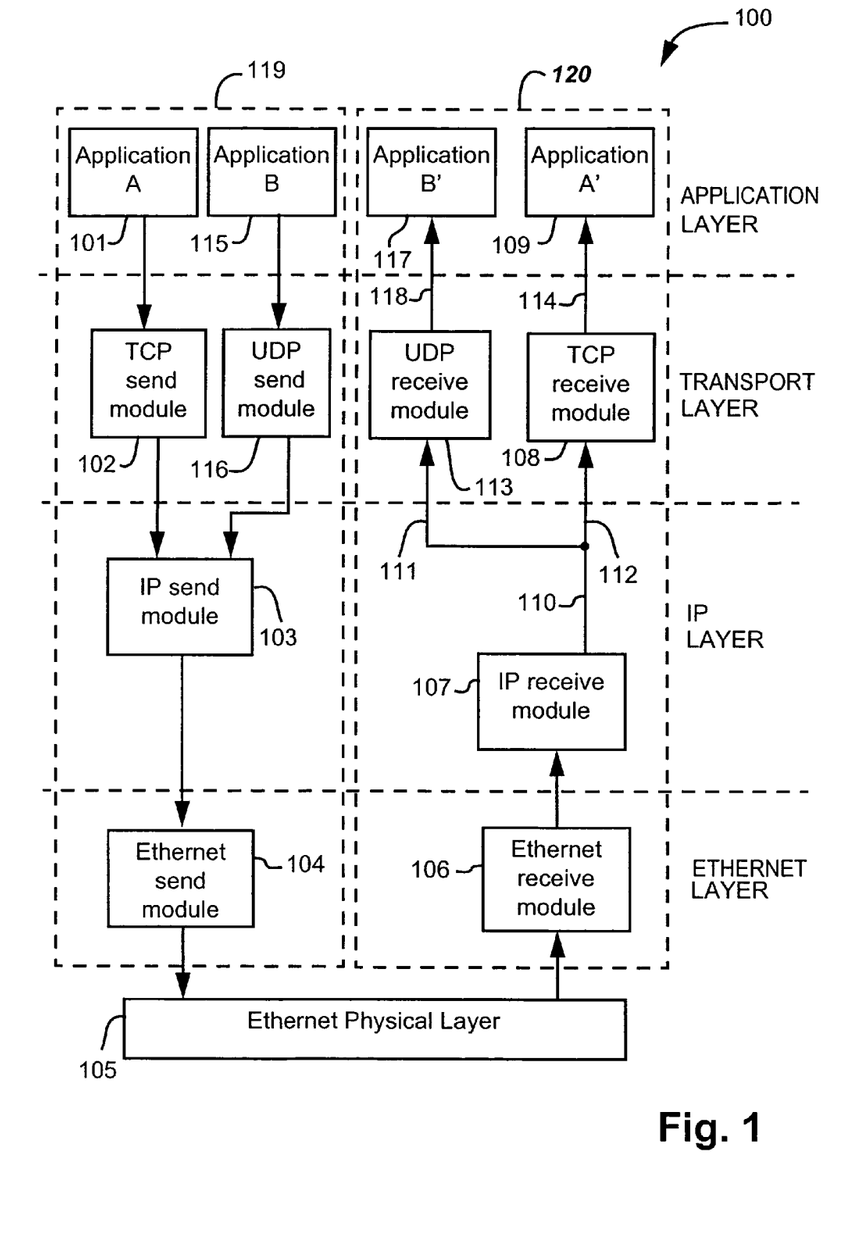
FIG. 1 shows a functional block diagram for a layered packet communication system.

FIG. 1 shows how a first software application "A" (ie 101) interacts with a second software application "A'" (ie 109) over a layered communication protocol stack. The protocol stack for this communication is based on TCP/IP over Ethernet. A third software application "B" (ie 115) interacts with a fourth software application "B'" (ie 117) over a layered communication protocol stack based on UDP/IP over Ethernet. Applications A and B (ie 101 and 115 respectively) are running on a "remote host machine" 119. Applications A' and B' (ie 109 and 117 respectively) are running on a "local host machine" 120. Modules 102-104 and 116 on the left hand side of FIG.

1 represent the "sending" part of the arrangement, whereas modules 106-107, 108 and 113 on the right hand side of FIG. 1 represent the "receiving" section of the arrangement. FIG. 1 is partitioned into four layers, namely an application layer containing the software applications 101, 115, 117 and 109, a transport layer containing TCP and UDP modules, an IP layer containing IP modules, and an Ethernet layer containing Ethernet modules.

A sending application 101 sends a bit-stream to a TCP send module 102 which arranges the bit-stream into successive TCP packets. These are sent to an IP send module 103, which encapsulates them into IP packets, after which an Ethernet send module 104 encapsulates the IP packets into Ethernet packets. The Ethernet packets are sent over a Ethernet physical layer 105 to an Ethernet receive module 106. Another sending application 115 sends a bit-stream to a UDP send module 116 which arranges the bit-stream into successive UDP packets. These are sent to the IP send module 103, which encapsulates them into IP packets, after which the Ethernet send module 104 encapsulates the IP packets into Ethernet packets, which are also sent over the Ethernet physical layer 105 to the Ethernet receive module 106.

This module 106 strips off the Ethernet header and checksum, and extracts the IP packets which are sent to an IP receive module 107. The IP receive module 107 strips off the IP header information, and extracts the TCP or UDP packets which are then sent to an appropriate one of a UDP receive module 113 and a TCP receive module 108 dependent upon a "protocol" field 307 which is described in more detail with reference to FIG. 3. If the packet is to be processed by the UDP protocol, then the packet is sent to the UDP receive module 113 as depicted by arrows 110 and 111. If, on the other hand, the packet is to be processed by the TCP protocol, then the packet is sent, as depicted by arrows 110 and 112, to the TCP receive module 108.

The present description will treat TCP processing in some detail, and will not describe UDP or any other protocol processing in any detail. The principles described, however, can be applied more generally than merely to TCP, as has already been noted. The TCP examples described are, therefore, illustrative and not intended to be limiting.

Considering the case where the packet at the IP receive module 107 is to be processed by the TCP protocol, the packet is provided to the TCP receive module 108 as noted, which strips off the TCP header information thereby providing the resultant bit-stream, as depicted by an arrow 114, to the application 109 (ie A').

Figure 2:
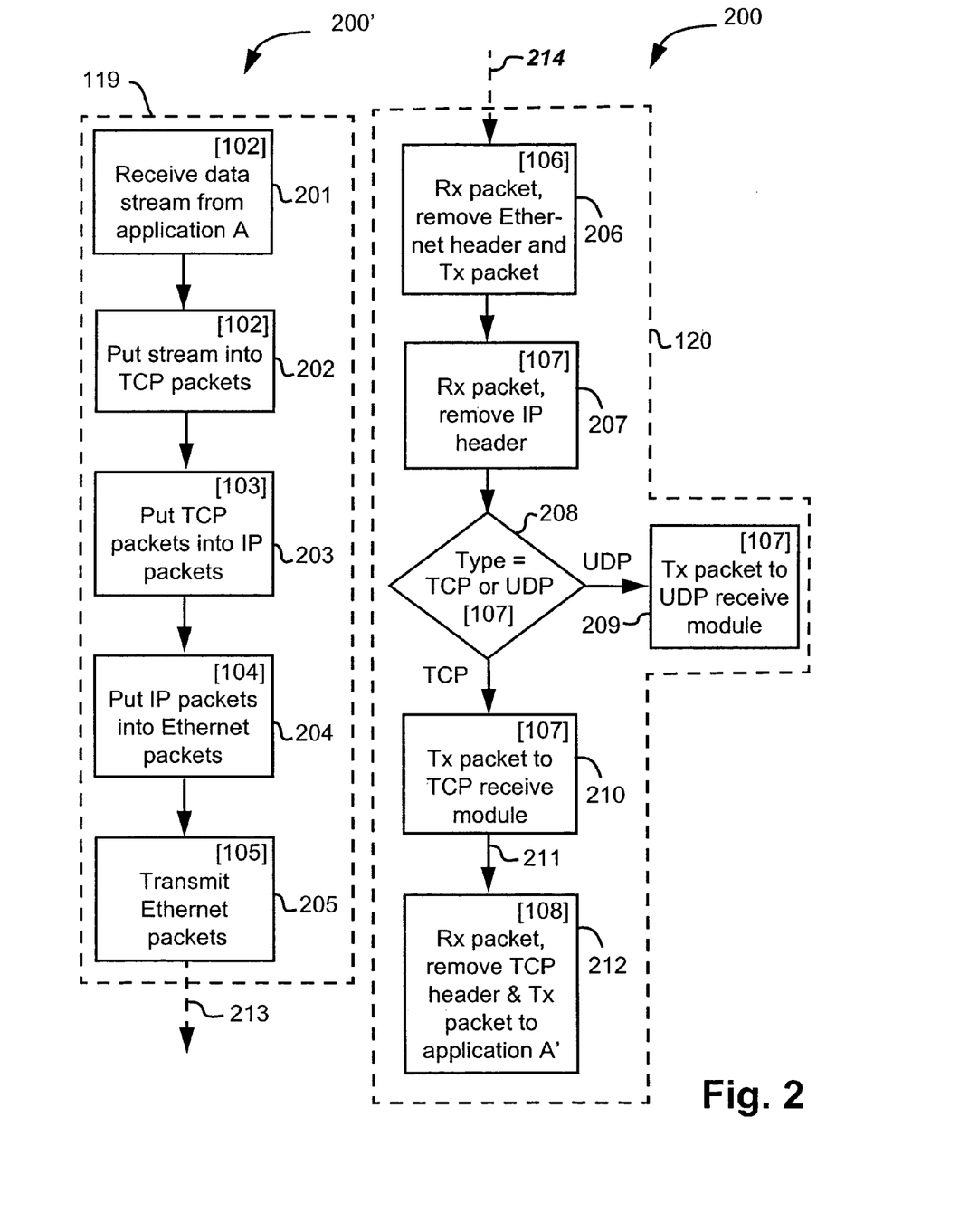
FIG. 2 is a process flow diagram for packet communications between software applications A and A' in FIG. 1.

FIG. 2 is a flow diagram of processes 200 and 200' for packet communications between the software applications A and A' of FIG. 1. The process thread 200' runs on the remote host machine 119, and the process thread 200 runs on the local host machine 120. FIG. 2 relates only to TCP communications, and does not make explicit mention of the UDP capability that is alluded to in FIG. 1. As previously noted, the use of TCP is merely illustrative, and is not intended to be limiting.

Turning to the process thread 200' in the remote host machine 119, a step 201, which is performed by the TCP send module 102 (as indicated by the numerals 102 in square brackets in the top right hand corner of the rectangle representing the step 201), receives a bit-stream from the application A (ie 101 in FIG. 1). Thereafter, a step 202, which is performed by the TCP send module 102, arranges this bit-stream into TCP packets.

A subsequent step 203, which is performed by the IP send module 103, encapsulates the TCP packets into IP packets. Thereafter, a step 204, which is performed by the Ethernet send module 104, encapsulates the IP packets into Ethernet packets. A step 205 then sends these packets over the Ethernet physical layer 105, as depicted by a dashed arrow 213.

Turning to the process thread 200, which runs on the local host machine 120, the Ethernet packets that have been sent over the Ethernet physical layer 105 are received, as depicted by a dashed arrow 214, in a step 206 which is performed by the Ethernet receive module 106. The step 206 strips off the Ethernet header and checksum, and transmits the extracted IP packet, after which a step 207, which is performed by the IP receive module 107 receives the packet, and removes the IP header. A subsequent testing step 208, which is also performed by the IP receive module 107, determines whether the extracted packet is a TCP packet, or a UDP packet. The testing step 208 is performed by considering the "protocol" field 307 in the IP packet 315 (see FIG. 3).

If the extracted packet is a UDP packet, then the process 200 is directed in accordance with "UDP" arrow to a step 209. The step 209, which is performed by the IP receive module 107, sends the packet to the UDP receive module 113. FIG. 2 does not provide any further description of the process in regard to this packet. If, on the other hand, the testing step 208 determines that the packet is a TCP packet, then the process 200 is directed in accordance with a "TCP" arrow to a step 210.

The step 210, which is performed by the IP receive module 107, transmits the packet to the TCP receive module 108. Thereafter, a step 212, which is performed by the TCP receive module 108, strips off the TCP header, and transmits the extracted data-stream to the application A'.

Figure 3:
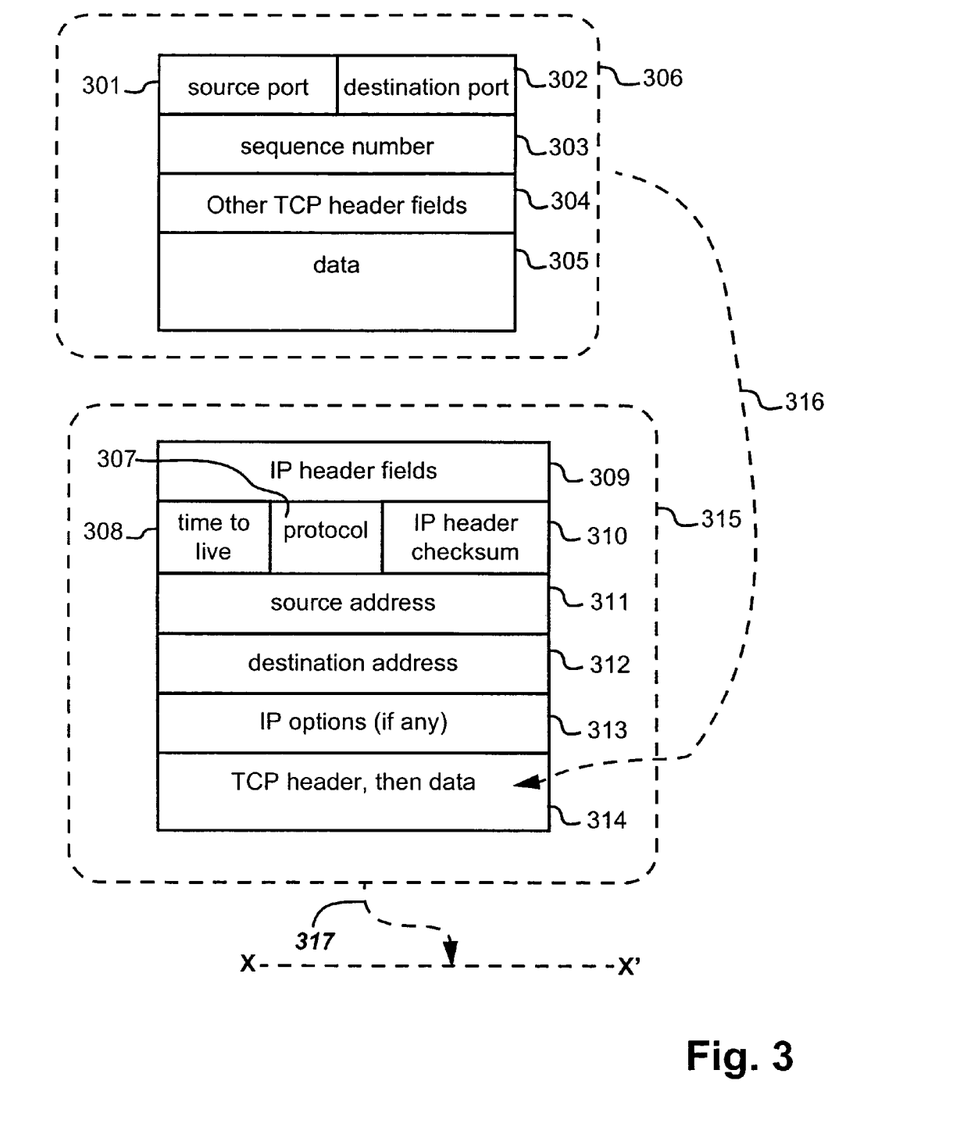
FIG. 3 shows structures of, and relationships between TCP and IP packets.

FIG. 3 shows structures of, and relationships between, TCP and IP packets. A TCP packet 306 comprises a "source port" field 301, a "destination port" field 302, a "sequence number" field 303, as well as other TCP header fields 304. The fields 304 are not described in any detail since they are not relevant to the present description. The data, such as was described as emanating from the application A (ie. 101 in FIG. 1), is shown in a data field having a reference numeral 305.

The TCP packet 306 is encapsulated, as depicted by a dashed arrow 316, into a field 314 of an IP packet 315. The IP packet 315 has IP header fields 309, a "time to live" field 308, the "protocol type" field 307, and an IP header checksum field 310. The IP packet 315 also has a "source address" field 311, a "destination address" field 312, and, perhaps, an IP options field 313. The field 314 holds the TCP packet 306, which consists of the TCP header fields 301-304, and then the TCP data 305. The protocol type field 307 is used by the IP receive module 107 in FIG. 1 to perform the step 208 in FIG. 2.

The IP packet 315 is encapsulated, as depicted by a dashed arrow 317, in an Ethernet packet 407 which will be described in detail with reference to FIG. 4.

Figure 4:
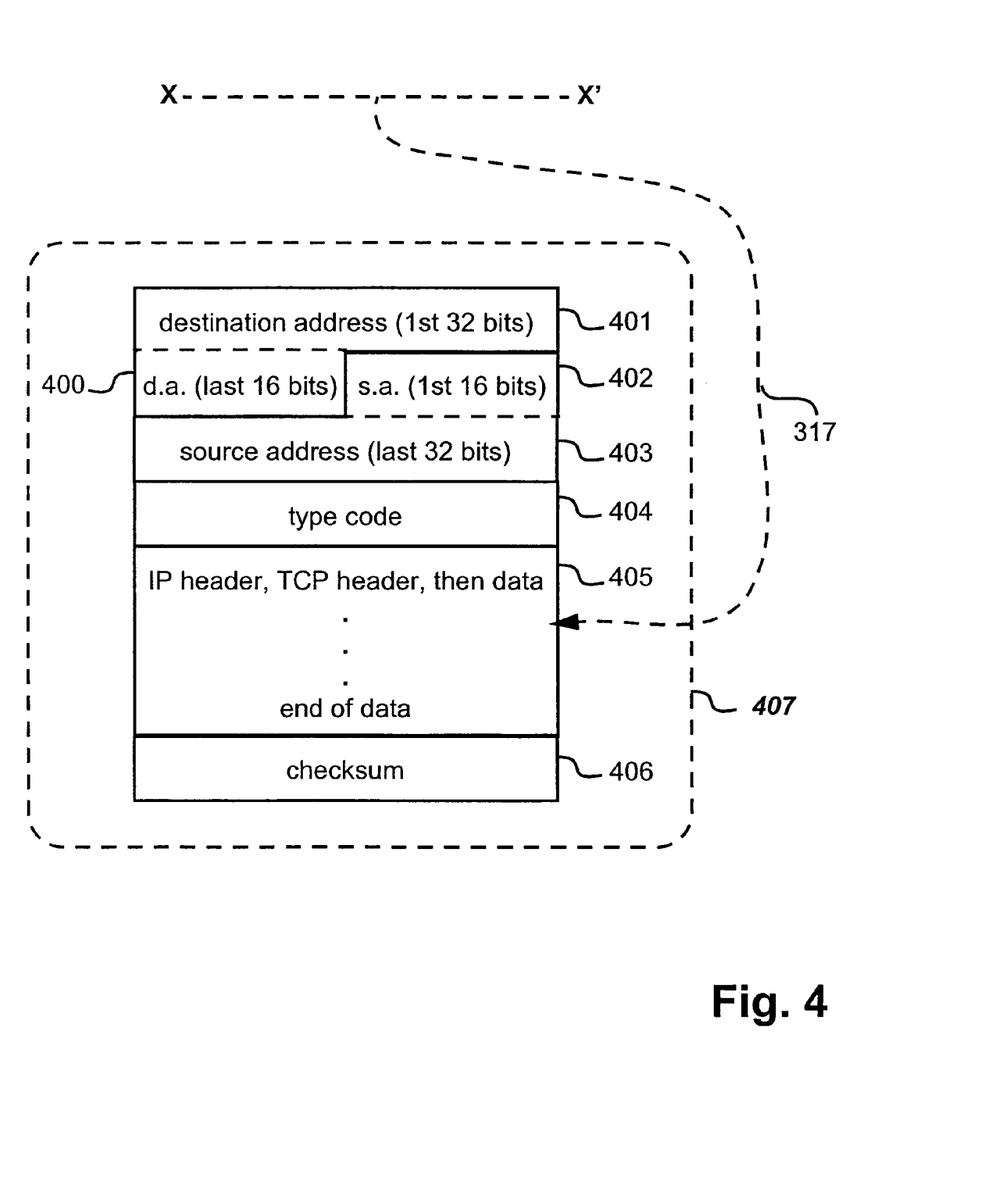
FIG. 4 shows the structure of an Ethernet packet, and the relationship between the Ethernet packet and the TCP/IP packets.

FIG. 4 shows the structure of the Ethernet packet 407, and the relationship between the Ethernet packet and the TCP/IP packets. The dashed arrow 317 shows how the IP packet 315 of FIG. 3 is inserted into the data field 405 of the Ethernet packet 407.

The Ethernet packet 407 comprises a "destination address" which is represented as a first field segment 401 having the first 32 data bits of the address, and a second data field segment 400 having the last 16 bits of the destination address. The packet 407 also has a "source address" located in a first field segment 402 which contains the first 16 bits of the source address, and a second data field segment 403 which has the last 32 bits of the source address. The Ethernet packet 407 has a "type code" field 404, which serves a similar purpose to that of the protocol type field 307 in the IP packet 315. The IP packet 315 is contained at the field 405 of the Ethernet packet

407. The IP packet 315 at the data field 405 consists of the IP header, the TCP header, and then the data. Finally, the Ethernet packet 407 has a checksum field 406.

Figure 5A:
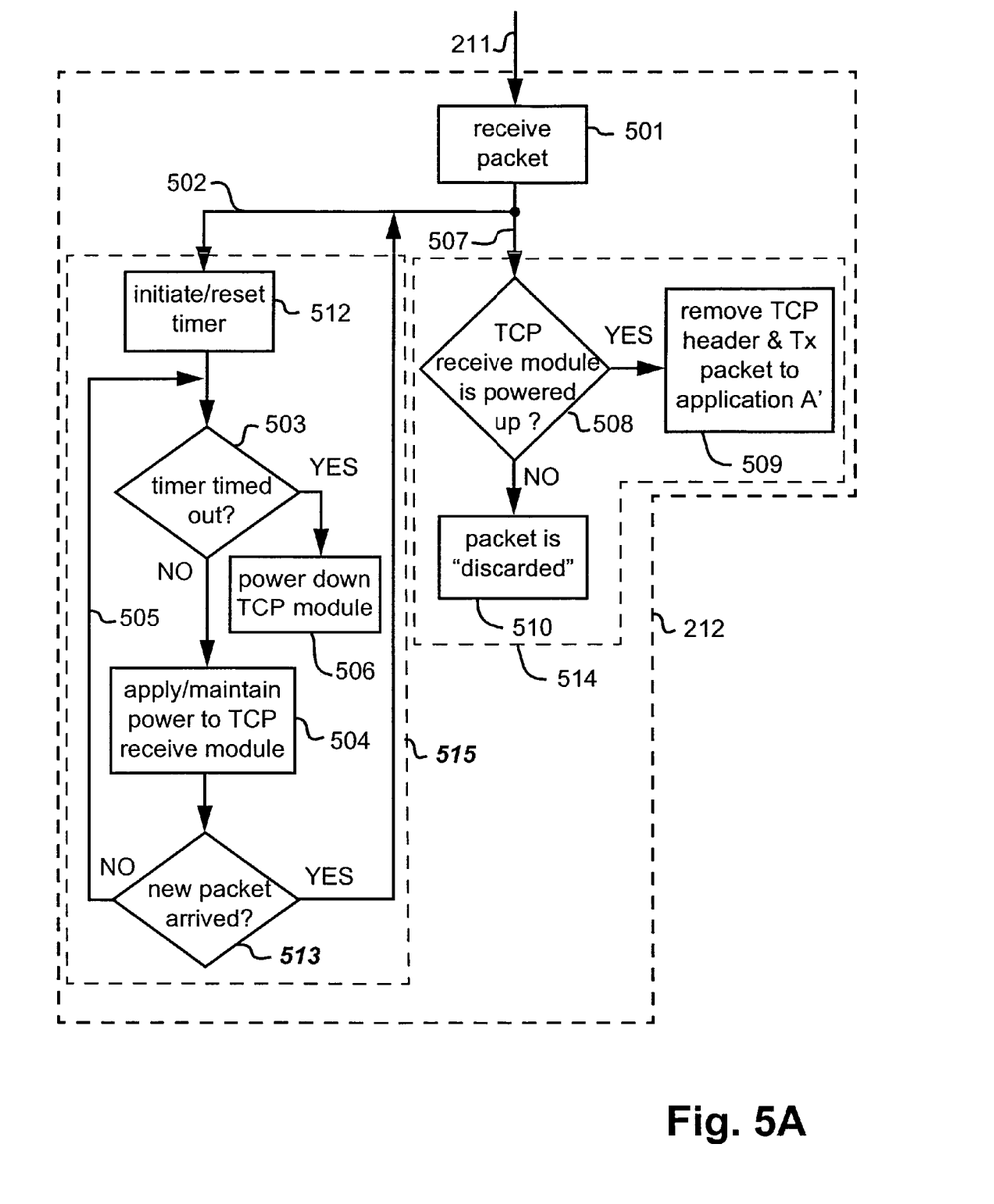
FIGS. 5A and 5B are process flow diagrams, for the local host machine and the remote host machine respectively, for selectively powering a protocol receive module.
Figure 5B:
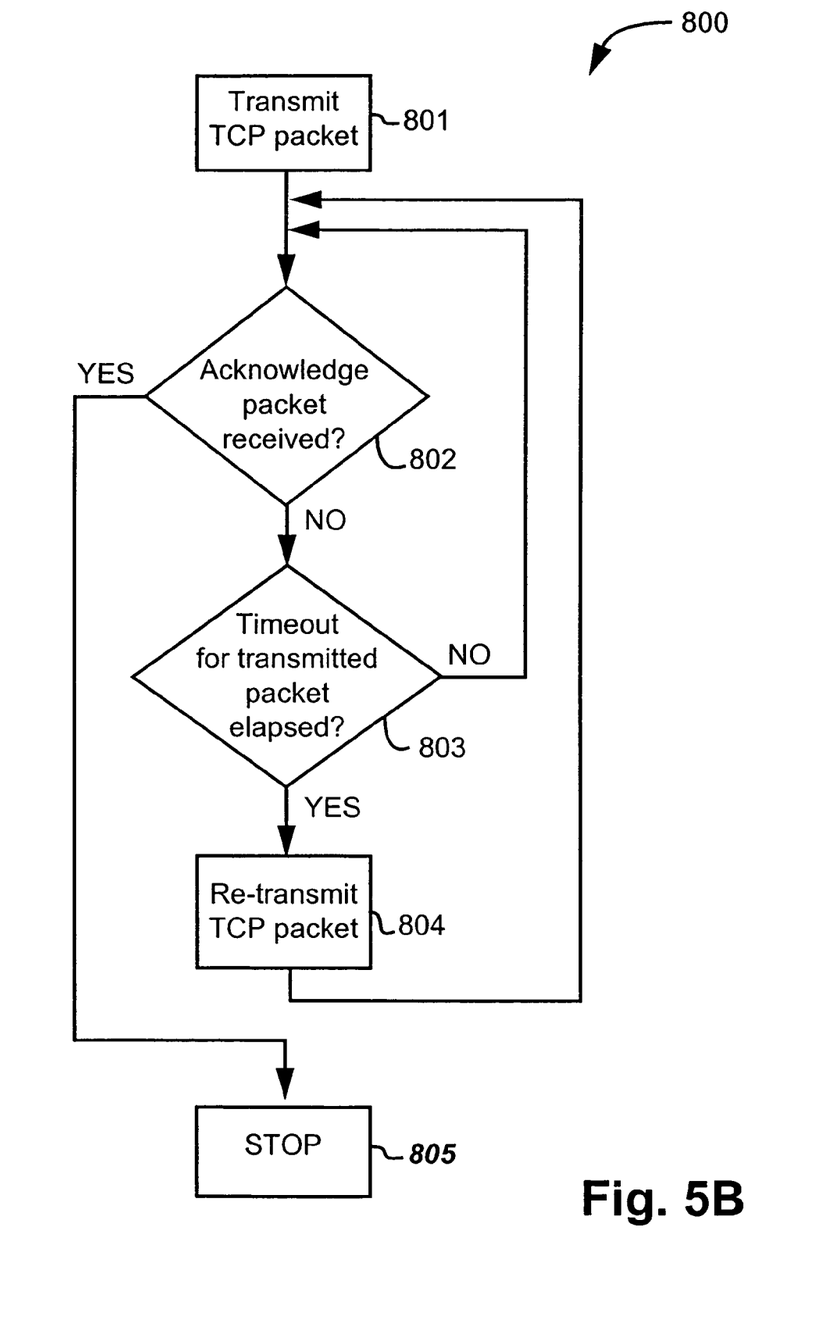

FIGS. 5A and 5B are process flow diagrams, relating respectively to the local host machine 120 and the remote host machine 119, for selectively powering a protocol receive module. The term "selectively powering" means either powering down the module to a "sleep mode", or alternately, powering up the module to an "awake mode".

FIG. 5A shows the step 212 of FIG. 2 which relates to the local host machine 120, in more detail. For the sake of describing FIG. 5A, the "step" 212 of FIG. 2 is referred to as the "process" 212. The process 212 in FIG. 2 is performed by the TCP receive module 108 in FIG. 1. The process 212, which is shown enveloped by a dashed polygon 212 in FIG. 5A, has, as an input, the arrow 211 which emanates from the step 210 in FIG. 2. A step 501 receives the TCP packet, after which the process 212 is directed according to an arrow 502 to a step 512 which initiates or resets a timer, depending on the state of the timer. The term "initiate" means that if the timer in question has timed out when the timer is "initiated", then the step 512 restarts the timer. The term "reset" means that if the timer in question has run part way through its timing cycle, but has not completed this timing cycle when the timer is "reset", then the step 512 restarts the timer.

A subsequent testing step 503 determines whether the timer has timed out. If this has not occurred, then the process 212 is directed, in accordance with a "NO" arrow to a step 504 which applies, or maintains power to the TCP receive module 108 of FIG. 1. The term "apply" in this context means that if the TCP receive module 108 has been powered-down and put to sleep, then the step 504 applies power again to the TCP receive module 108 thereby waking the module up. The term "maintain" in this context means that if the TCP receive module is presently in the powered-up or awake state, then the step 504 maintains the power to this module 108, thereby maintaining the module in the wake state. The process 212 is then directed to a testing step 513 that determines if a new packet has arrived. If this is the case, then the process follows a "YES" arrow to the step 512. If the testing step 513 determines that a new packet has not arrived, then the process 212 follows a "NO" arrow 505, back to the step 503.

Returning to the decision step 503, if the timer has timed out then the process 212 is directed to a step 506 which powers down the TCP module 108, putting it to sleep. The TCP receive module 108 will remain in the powered-down condition until the next packet is received by the step 501, after which the step 512 will again initiate the timer, resulting in application of power to the TCP receive module 108 by the step 504.

Returning to the step 501, the process 212 is directed in accordance with an arrow 507 to a testing step 508. The step 508 determines whether the TCP receive module 108 is in the powered-up state, ie the step 508 determines if the receive module 108 is functionally able to process the incoming packet. If this is the case, then the process 212 is directed in accordance with a "YES" arrow to a step 509 which strips off the TCP header, and forwards the extracted data bits to the application A'. In the case of TCP, an acknowledge packet may be sent back to the remote application A to indicate proper receipt of the packet. It is noted that the step 509 can only take place if the TCP receive module 108 is functionally able to process the packet received at the step 501. The extent to which the TCP receive module must be powered up to be functionally able to process the packet depends upon the specific implementation of the receive module 108.

Returning to the decision step 508, if the TCP receive module 108 is not in a (sufficiently) powered-up condition to process the incoming packet, then the process 212 is directed in accordance with a "NO" arrow to a step 510. The step 510 depicts the situation in which the TCP receive module 108 is unable to successfully process the packet received at the step 501, and accordingly, that this packet is discarded.

The steps 512, 503, 504, 506, and 513 form a first process 515 that deals with powering up of the receive module. The steps 508-510 form a second process 514 that deals with processing of the received packet. The processes 514 and 515 are concurrent.

For the present example of TCP, the timer referred to in the step 512 enables power to be provided to the TCP receive module 108 for a predetermined time defined by the timer parameters. This predetermined time must be greater than the sum of the idle time, and the retransmission time of the transmission path between the remote host machine 119 running the application A (ie 101) and the local host machine 120 running the application A' (ie. 109). This ensures that the packet that is re-transmitted by the remote host machine 119 will be received, in the local host machine 120, by the step 501 while the TCP receive module 108 is still in the "powered-up" condition. This powered-up condition was initiated by the previous incoming packet which was consequently "discarded". Accordingly, it is the "discarded" packet which prepares the TCP receive module 108 for the re-transmitted packet which is then successfully processed.

For UDP, the timeout time (ie predetermined time defined by the timer parameters) must be greater than the idle time.

FIG. 5B shows how the discarded packet is retransmitted by the remote host machine 119, thereby maintaining the integrity of the data communication between the applications A and A' (ie 101 and 109 respectively) in FIG. 1 for this TCP example. When the present selective powering technique is used for "unreliable" communication protocols such as UDP, then the discarded packet referred to in the step 510 is not retransmitted by the remote host machine 119.

FIG. 5B shows a process flow diagram 800 which runs in the remote host machine 119 concurrently with the process depicted in FIG. 5A which runs in the local host machine 120. All the process steps in FIG. 5B are performed by the TCP send module 102 in FIG. 1. The process 800 commences with a step 801 in which the remote host machine 119 transmits a TCP packet to the local host machine 120. Thereafter, a testing step 802 in the remote host machine 119 checks whether an "acknowledge" packet has been received at the remote host machine 119 from the local host machine 120, thereby indicating that the TCP packet that has been sent by the remote host machine 119 was properly received by the local host machine 120. If the acknowledge packet has been received by the remote host machine 119, then the process 800 is directed in accordance with "YES" arrow to a stop step 805. If, on the other hand, the acknowledge packet has not been received by the remote host machine 119, then the process 800 is directed in accordance with a "NO" arrow from the step 802 to a step 803. The step 803 determines whether a time out period has expired for the transmitted TCP packet. If this is not the case, then the process 800 is directed in accordance with a "NO" arrow back to the step 802. If, on the other hand, the time out period has expired, then the process 800 is directed in accordance with a "YES" arrow to a step 804 in which the remote host machine 119 re-transmits the TCP packet. The process 800 is then directed from the step 804 back to the step 802.

Considering the present TCP example, the robustness of the TCP transport layer, provided by the packet re-transmission facility, means that discarded packets do not substantially affect the integrity of the communication between the application A and the application A'. If the selective powering technique is applied to an "unreliable" communication protocol such as UDP, then the packets discarded in the step 510 of FIG. 5 do not effect the integrity of the communication, in this case between the applications B and B' (ie 115 and 117 respectively in FIG. 1), because communications using UDP are not sensitive to the loss of occasional packets.

It is noted that the process 800 which is described in relation to FIG. 5B is relevant only for "reliable" communication protocols such as TCP which use packet re-transmission as a mechanism for ensuring robust communications. The process 800 is not required for "unreliable" communication protocols.

Figure 6:
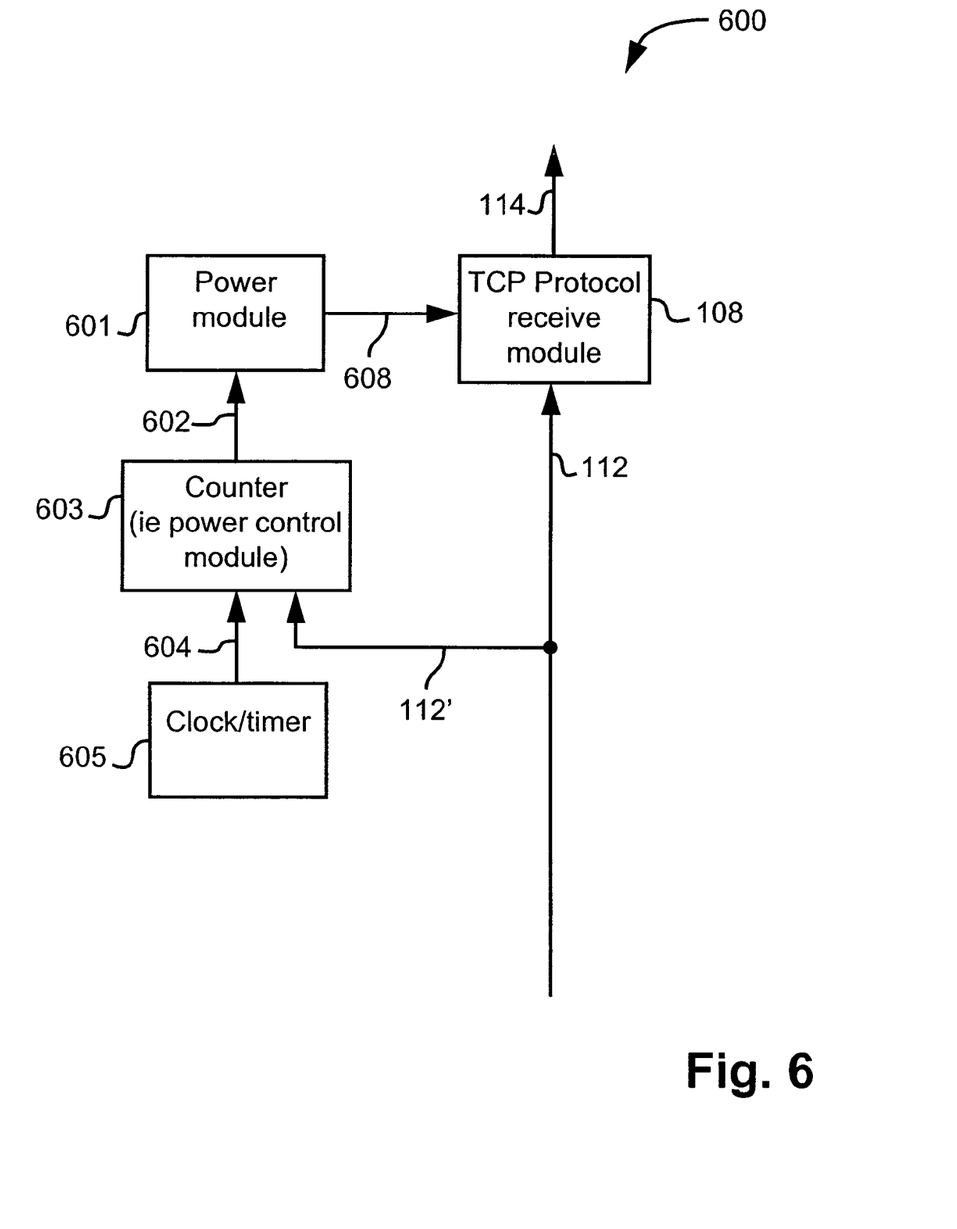
FIG. 6 is a functional block diagram of a system for implementing the process flow of FIG. 5A.

FIG. 6 is a functional block diagram of an arrangement for implementing the process flow of FIG. 5A. The TCP protocol receive module 108 receives TCP packets as depicted by the arrow 112, and delivers the extracted bit-stream to the application A' as depicted by the arrow 114 (see FIG. 1). The receive module 108 receives power, as depicted by an arrow 608, from a power module 601. The power module 601 is, in turn, controlled (ie directed to either provide power or remove power from the module 108) by a signal depicted by an arrow 602 from a counter 603. The power module 601 provides power to the TCP module 108 while the power module 601 is receiving an "enable" signal from the counter 603. The power module 601 removes power from the TCP module 108 while the power module 601 is receiving a "disable" signal from the counter 603. The counter 603 in this instance serves as a power control module.

When a TCP packet is provided as depicted by the arrow 112 in FIG. 1, the packet arrival at 112 acts as a control signal, as depicted by an arrow 112', to the counter 603 thereby loading the counter with data which determines the timer timing interval (otherwise referred to as the timing cycle). The counter 603 then proceeds to count down in accordance with a clock/timer 605 which sends clock signals to the counter 603 as depicted by an arrow 604. The clock/timer can be implemented either by using the system clock directly (in which case the module 605 is referred to as a "clock") or by using a timer that is driven by the system clock (in which case the module 605 is referred to as a "timer"). Implementing the module 605 as a timer enables a smaller hardware module to be used to implement the counter 603.

As long as the counter 603 has a non-zero time-interval remaining (ie as long as the counter 603 has not reached a "zero" condition), the counter provides an "enable" signal on 602 to the power module 601 which provides power as depicted by the arrow 608 to the TCP receive module 108. When the counter 603 reaches a zero count, the counter 603 provides a "disable" signal on 602 to the power module 601, which removes the power to the TCP receive module 108, which then powers down.

If the receive module 108 is in the "power-down" condition when a packet is received as depicted by the arrow 112, then the power control module 603 is activated as depicted by the arrow 112', and the module 603 provides an "enable" signal 602 to the power module 601. The power module 601 then powers up the receive module 108 as depicted by the arrow 608.

If the TCP receive module 108 is already in the "powered-up" condition, an arriving packet as depicted by the arrow 112' causes the counter 603 to be restarted, this causing provision of power to be maintained to the received module 108 for a further predetermined time interval determined by the parameters of the counter 603.

Figure 7:
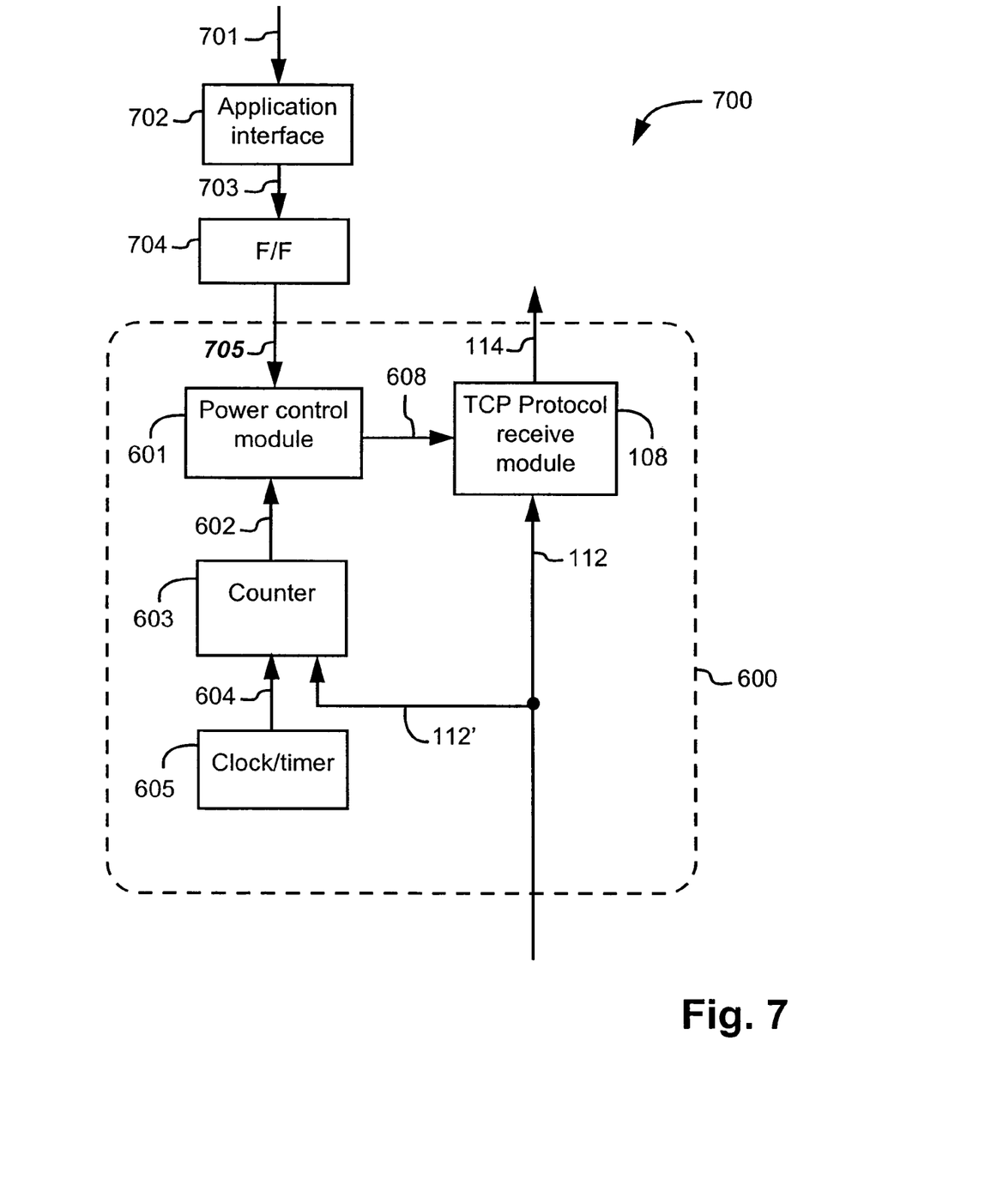
FIG. 7 is an alternate functional block diagram of a system for implementing the process flow of FIG. 5A using a software application.

FIG. 7 is a functional block diagram of an arrangement 700 for selectively powering, ie waking and putting to sleep, the receive module using a software application. The arrangement 600 of FIG. 6 is shown within a dashed rectangle 600 in FIG. 7. In FIG. 7, a software application, such as the application A' (ie 109 in FIG. 1) provides a signal as depicted by an arrow 701 to an application interface 702. The application interface 702 provides an input, as depicted by an arrow 703, to a flip flop 704 which, depending on its previous state, sends either an "enable" or a "disable" signal as depicted by an arrow 705 to the power control module 601. In FIG. 7, therefore, the TCP receive module 108 is provided with power by one of two alternate mechanisms, namely either by arrival of a packet as depicted by the arrow 112, or alternately by a control signal 705 from a software application.

The counter 603 in FIGS. 6 and 7 can be made smaller by implementing the clock/timer 605 as a global millisecond timer, for example, that acts as a clock enable, whenever it overflows, for all the counters 603. The particular global timer used determines the granularity with which the counter(s) 603 count down. Accordingly, if the timer 605 is a millisecond timer, then the counter 603 counts down with millisecond granularity.

In the disclosed arrangement, while packets are not arriving, all modules arranged according to the disclosed selective powering architecture are in a powered-down condition, thereby minimising the amount of power consumed. When a packet arrives, only those modules that are required by the packet are woken, ie. powered-up. In general, unless multiple communications connections are active at the same time, only a small fraction of the protocol stack will be powered up at any time. This applies, of course, to the "receive" section of FIG. 1, namely modules 106-107, 108 and 113.

Although the present description has been couched in terms of a TCP example, the principle is more widely applicable as already noted.

The traffic type, as reflected, for example, in the "protocol type" field 307 in FIG. 3, which makes up the bit-stream from the applications A and B (ie 101,115 in FIG. 1), determines which modules are powered-up at any time.

The disclosed technique for selective powering of protocol modules works best for systems in which data streams comprise bursts of traffic.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

The claims defining the invention are as follows:

1. A power module for selectively powering a receive module in response to receiving a traffic packet using a packet protocol, wherein the receive module has a powered-up state and a powered-down state and wherein the receive module is powered up to send an acknowledgement packet, the power module comprising: determining means for determining if the received packet protocol is a reliable protocol; power control means comprising a processor for controlling power of the receive module; wherein the power control means leaves undisturbed control power such that: a current power state in the receive module is left undisturbed if the receive packet protocol is an unreliable protocol; wherein the power control means powers down the receive module if the receive packet protocol is the unreliable protocol, the receive module being powered down after a first predetermined time that is greater than an idle time of the receive module; and wherein the power control means applies or maintains power from the power module to the receive module for a second predetermined time if the received packet protocol is the reliable protocol, thereby selectively powering the packet protocol receive module to send an acknowledgement, the second predetermined time being greater than the sum of the idle time of the receive module and a retransmission time of the traffic packet.

2. A power module according to claim 1, wherein the reliable protocol is one of at least:
   TCP;
   RUDP; and
   SPX.

3. A power module according to claim 1, further comprising:
   means for determining if the receive module is in the powered-up state in response to receiving the traffic packet;
   means for discarding the traffic packet if the receive module is not in the powered-up state;
   means for processing the traffic packet if the receive module is in the powered-up state;
   means for applying or maintaining power to the receive module for a further second predetermined time if a succeeding packet arrives before the second predetermined time has elapsed; and
   means for powering down the receive module to the powered-down state if the second predetermined time elapses without arrival of the succeeding packet.

4. A method of selectively powering a packet protocol receive module in response to receiving a traffic packet using a packet protocol, wherein the receive module has a powered-up state and a powered-down state and wherein the receive module is powered up to send an acknowledge packet, the method comprising the steps of:
   determining if the received packet protocol is a reliable protocol;
   leaving undisturbed a current power state in the receive module if the received packet protocol is an unreliable protocol;
   powering down the receive module if the received packet protocol is the unreliable protocol, the receive module being powered down after a first predetermined time that is greater than an idle time of the receive module;
   applying or maintaining power from a power module to the receive module for a second predetermined time if the received packet protocol is a reliable protocol, thereby selectively powering the packet protocol receive module to send an acknowledge packet, the second predetermined time being greater than the sum of the idle time of the receive module and a retransmission time of the traffic packet.

5. A method according to claim 4, wherein the reliable protocol is one of at least:
   TCP;
   RUDP; and
   SPX.

6. A method according to claim 4, the method further comprising the steps of:
   determining if the receive module is in the powered-up state in response to receiving the traffic packet;
   discarding the traffic packet if the receive module is not in the powered-up state;
   processing the traffic packet if the receive module is in the powered-up state;
   applying or maintaining power to the receive module for a further second predetermined time if a succeeding packet arrives before the second predetermined time has elapsed; and
   powering down the receive module to the powered-down state if the second predetermined time elapses without arrival of the succeeding packet.

7. A computer readable storage medium having recorded thereon a computer-executable computer program for directing a power module to selectively power a packet protocol receive module in response to receiving a traffic packet using a packet protocol, wherein the receive module has a powered-up state and a powered-down state and wherein said receive module is powered up to send an acknowledge packet, the program comprising:
   code for determining if the received packet protocol is a reliable protocol;
   code for leaving undisturbed a current power state in the receive module if the received packet protocol is an unreliable protocol;
   code for powering down the receive module if the received packet protocol is the unreliable protocol, the receive module being powered down after a first predetermined time that is greater than an idle time of the receive module;
   code for applying or maintaining power from the power module to the receive module for a second predetermined time if the received packet protocol is a reliable protocol, thereby selectively powering the packet protocol receive module to send an acknowledge packet, the second predetermined time being greater than the sum of the idle time of the receive module and a retransmission time of the traffic packet.

8. A computer readable storage medium according to claim 7, the program further comprising:
   code for determining if the receive module is in the powered-up state in response to receiving the traffic packet;
   code for discarding the traffic packet if the receive module is not in the powered-up state;
   code for processing the traffic packet if the receive module is in the powered-up state;
   code for applying or maintaining power to the receive module for a further second predetermined time if a succeeding packet arrives before the second predetermined time has elapsed; and
   code for powering down the receive module to the powered-down state if the second predetermined time elapses without arrival of the succeeding packet.

* * * * *